US010183759B2

(12) United States Patent
Cazenave et al.

(10) Patent No.: US 10,183,759 B2
(45) Date of Patent: Jan. 22, 2019

(54) ADJUSTABLE ENGINE SUSPENSION FOR POSITIONING THE ENGINE RELATIVE TO THE MOUNT THEREOF

(71) Applicant: Microturbo, Toulouse (FR)

(72) Inventors: Olivier Cazenave, Pibrac (FR); Clement Lalanne, Toulouse (FR); Luc Dionne, Quebec (CA)

(73) Assignee: SAFRAN POWER UNITS, Toulouse (FR)

( * ) Notice: Subject to any disclaimer, the term of this patent is extended or adjusted under 35 U.S.C. 154(b) by 219 days.

(21) Appl. No.: 15/100,607

(22) PCT Filed: Dec. 4, 2014

(86) PCT No.: PCT/FR2014/053171
§ 371 (c)(1),
(2) Date: May 31, 2016

(87) PCT Pub. No.: WO2015/082854
PCT Pub. Date: Jun. 11, 2015

(65) Prior Publication Data
US 2016/0297539 A1 Oct. 13, 2016

(30) Foreign Application Priority Data

Dec. 6, 2013 (FR) ...................................... 13 62228

(51) Int. Cl.
*G09B 25/02* (2006.01)
*B64D 41/00* (2006.01)
(Continued)

(52) U.S. Cl.
CPC ............... *B64D 41/00* (2013.01); *B64F 5/00* (2013.01); *F16M 13/02* (2013.01);
(Continued)

(58) Field of Classification Search
USPC ............ 434/29, 30, 33, 37, 46, 55, 56, 389; 244/54; 248/554–557
See application file for complete search history.

(56) References Cited

U.S. PATENT DOCUMENTS 2,196,563 A 4/1940 Neugebauer
2,753,140 A * 7/1956 Hasbrouck ............. B64D 27/26
248/555
(Continued)

FOREIGN PATENT DOCUMENTS

DE 2300125 7/1974
EP 2602193 6/2013

*Primary Examiner* — Kurt Fernstrom
(74) *Attorney, Agent, or Firm* — Womble Bond Dickinson (US) LLP

(57) ABSTRACT

The invention relates to a method for mounting an engine module (1) in a support comprising a first structure (3) and a second structure (2) that is offset relative to the first structure (3), method intended for positioning at least a specified part (4) of the engine module (1) relative to an element (6) of the second structure (2) by means of an isostatic suspension connecting the engine module (1) to said first structure (3) by means of first connecting rods (10*a*, 10*b*, 10*c*, 10*d*) and to said second structure (2) by means of second connecting rods (10*e*, 10*f*), the length of said first and second connecting rods being defined in advance, method wherein the length of at least two (10*c*, 10*f*) of said first and second connecting rods is adjusted relative to the previously defined length thereof, in order to position said specified part (4) of the engine module (1) relative to said element (6) of the second structure (2) in said support. The invention also relates to said support comprising adjustable connecting rods, in an installation comprising in particular an auxiliary power unit for an aircraft.

16 Claims, 3 Drawing Sheets

(51) Int. Cl.
*B64F 5/00* (2017.01)
*F16M 13/02* (2006.01)
*G09B 19/00* (2006.01)

(52) U.S. Cl.
CPC ......... *G09B 19/0069* (2013.01); *G09B 25/02* (2013.01); *B64D 2041/002* (2013.01); *Y02T 50/44* (2013.01)

(56) References Cited

U.S. PATENT DOCUMENTS

| | | | |
|---|---|---|---|
| 3,085,773 A | | 4/1963 | Anstrom et al. |
| 3,809,340 A | * | 5/1974 | Dolgy .................... B64D 27/20 244/54 |
| 3,831,888 A | * | 8/1974 | Baker .................... B64D 27/18 244/54 |
| 5,065,959 A | * | 11/1991 | Bhatia .................... B64D 27/14 244/54 |
| 7,083,143 B2 | * | 8/2006 | Whitmer ................ B64D 27/18 244/54 |
| 7,451,947 B2 | * | 11/2008 | Machado ................ B64D 27/12 244/54 |
| 7,997,527 B2 | * | 8/2011 | Lafont ................... B64D 27/18 244/54 |
| 8,191,823 B2 | * | 6/2012 | Guering ................. B64C 15/12 244/54 |
| 8,348,191 B2 | * | 1/2013 | West ...................... B64D 27/26 244/54 |
| 8,398,018 B2 | * | 3/2013 | Ramlaoui ............... B64D 29/06 244/54 |
| 2006/0059891 A1 | | 3/2006 | Sheoran et al. |

* cited by examiner

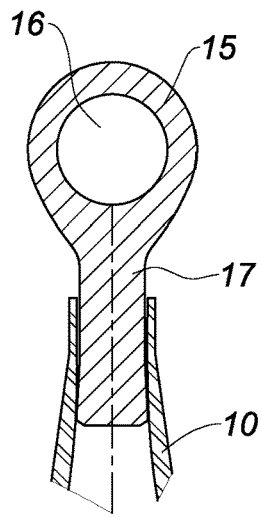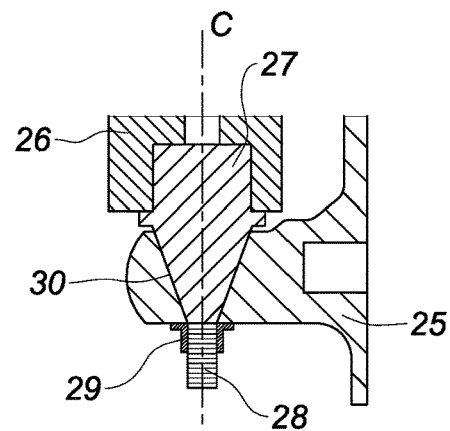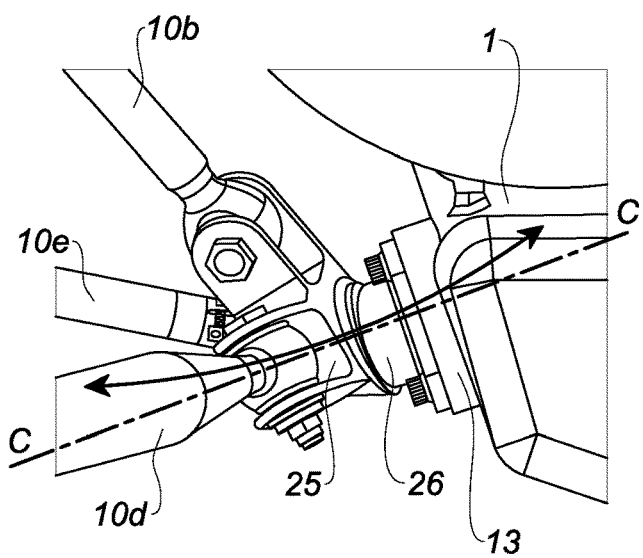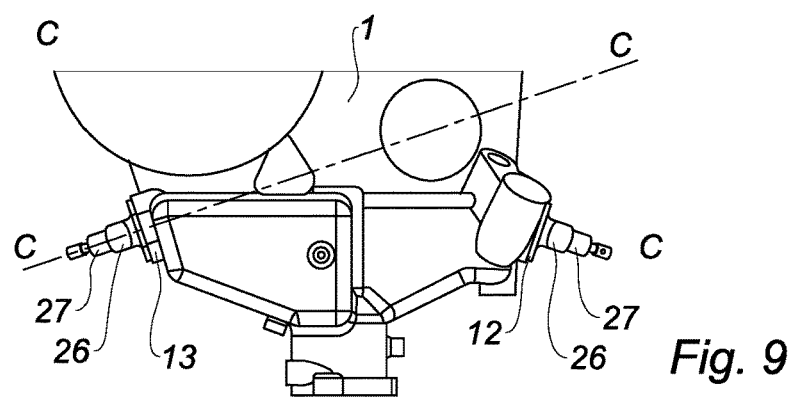

ADJUSTABLE ENGINE SUSPENSION FOR POSITIONING THE ENGINE RELATIVE TO THE MOUNT THEREOF

FIELD OF THE INVENTION

The present invention relates to the field of engine suspension, in particular in an aircraft. It relates more particularly to the precise positioning of the engine inside the aircraft relative to equipment that is to cooperate with this engine in order to ensure correct functioning.

PRIOR ART

The invention relates in particular to an auxiliary power unit, also referred to as APU in the industry. An APU can provide power to the equipment (alternators, pumps, load compressors, air-conditioning) of the aircraft, directly and/or indirectly via a power transfer case, in particular during transient flight conditions.

Like any turbine engine, an APU conventionally comprises an assembly that consists of a compressor, combustion chamber and turbine, and forms a gas generator. Fresh air is introduced into the compressor and then the compressed air, mixed with the fuel, causes combustion in the dedicated chamber. The hot gases have expanded in the turbine, which transmits some of the mechanical power produced to the compressor via a transmission shaft, the residual power being directed to the equipment via a power transfer case. In another type of architecture, the kinetic power of the exhaust gases may also drive a free turbine which, in turn, transmits power, via a shaft, to the equipment (alternators, pumps, load compressor, etc.). The residual gases are discharged through an exhaust nozzle.

The APU in general forms a module that integrates the turbine engine with various accessories, such as a power transfer case and a lubrication system, and which is installed in a dedicated compartment. On civilian aircraft, for example, the auxiliary power unit is traditionally mounted inside the tail cone and is fixed upstream to a bulkhead of the fuselage that participates in maintaining the structure of the aircraft.

The installation of the APU in its compartment comprises in particular a duct, the main function of which is to allow gases to escape from the turbine engine to the outside of the aircraft. The presence of this duct may, moreover, be used to provide the ventilation and cooling of the APU and its accessories, as explained in FR 2969123.

For this purpose, the mouth of the exhaust duct is flared such that it can receive the outlet nozzle of the turbine engine while providing a gap between the two. This gap makes it possible to suction the air from the compartment using the Venturi effect and to thus create a secondary air circulation cooling the APU compartment and in particular its equipment and its external parts. It is important to maintain the shape of this gap between the outlet from the turbine engine and the exhaust duct in order to provide cooling. The position of the exhaust duct is therefore generally adjusted relative to the APU.

In addition, generally the exhaust nozzle of the turbine engine is located at the rear of the APU, and the exhaust duct guides the gases to an orifice in the wall of the tail cone located a little further to the rear. This arrangement makes it necessary to position the APU, the duct and the wall of the tail cone at points that are distributed along the elongation direction of the tail cone, along the axis of the fuselage.

Moreover, the device suspending the APU in the tail cone, for example, in general comprises four links fixing the front of the APU to the bulkhead of the fuselage, two fixing the APU to the structure of the tail cone. The rear of the APU, together with the nozzle outlet, is thus left free in order to adapt the exhaust in a generally small space in this region of the compartment.

In this configuration, since the bulkhead at the front of the tail cone fixes a reference, the manufacturing tolerances of the various elements may give rise to significant variations in relative position between the nozzle of the APU and the mouth of the exhaust. These variations may be caused by the devices holding the APU. However, they may be also be due to the structure of the tail cone, a slight warping of which, for example, may significantly displace the position of the orifice whereas the APU is correctly aligned relative to the axis of the fuselage.

Manufacturing parts precisely enough to align all the elements has been found to be complex and expensive.

One existing solution, which consists in fixing the upstream part of the duct in the tail cone by means of plates in which slots are arranged, making it possible to adapt the position at which they are bolted to the structure, has been found to be unsatisfactory. Firstly, it does not always make it possible to align the mouth of the duct with the outlet of the nozzle without the other end of the duct bearing on the edges of the orifice in the tail cone in which it must emerge. This type of solution creates stresses on the assembly, which may cause premature wear to the various elements, in particular the fire-resistant gasket that is installed at the orifice. Secondly, these plates make the assembly heavier.

The problem that has just been disclosed may be found in other situations. The object of the invention is to provide a solution for correctly aligning the assembly consisting of an engine module, in particular an APU, an accessory module, and part of the structure of the compartment that contains them, without requiring excessive precision in manufacture thereof, in particular with regard to the structure of the compartment.

DISCLOSURE OF THE INVENTION

The invention relates to a method for mounting an engine module in a support comprising a first structure and a second structure that is offset relative to the first structure, which method is intended for positioning at least a specified part of the engine module relative to an element of the second structure by means of an isostatic suspension connecting the engine module to said first structure by means of first connecting rods and to said second structure by means of second connecting rods, the length of said first and second connecting rods being defined in advance. The method is a method wherein the length of at least two of said first and second connecting rods is adjusted relative to the previously defined length thereof, in order to position said specified part of the engine module relative to said element of the second structure in said support.

The fact that the second structure is offset indicates that it is located to one side of the first structure relative to a characteristic direction. In particular, the attachment points of the connecting rods to this second structure and the element relative to which the engine is to be positioned are located on the same side in this offset direction.

The engine module is an assembly that can be handled as a single piece. It comprises the turbine engine together with some equipment directly related to the functioning thereof, such as the gas outlet nozzle and the air inlet orifice, or to the transmission of the power thereof, such as the power transfer case for an APU.

Since the suspension of the engine module is isostatic, it essentially comprises six connecting rods, each mounted on a ball joint at its points of attachment to the first or second structure and to the engine module. The suspension has been defined in advance in that the positions of the attachment points and the lengths of the connecting rods have been determined so as to control the six degrees of freedom and to position the engine, in particular at the specified part which must correspond to an element of the second structure, on the basis of theoretical directions of the structures and of the engine module. For an APU, for example, the zone to be positioned would be the outlet nozzle of the turbine engine, which must be aligned with an exhaust duct.

The invention is a response to the fact that the manufacture of the various elements, whether this be the structures, the engine module or the connecting rods, necessarily permits tolerances with respect to the theoretical dimensions. The engine module installed together with the suspension thus manufactured is therefore not necessarily exactly positioned so as to match the element of the second structure.

Varying the length of one connecting rod, the other connecting rods having a fixed length, shifts the module in a movement such that the points of attachment thereof to the other connecting rods move on spheres centred on the points of attachment to the structures of the corresponding connecting rods. Since the engine module is close to the correct position, kinematic studies show that, in particular for installations of auxiliary power units in aircraft, adjusting two connecting rods corresponds to combining a minimum number of adjustable links in order to take up manufacturing variations on the installation and to position at least some parts of the module that must be placed relative to other items of equipment. It is thus possible to take up a variation in position relative to the mouth of the exhaust duct, said duct having previously been correctly centred relative to the second structure.

It is possible in particular to use a method in which the two length-adjustable connecting rods are intended for controlling movements transverse to the offset direction on at least one zone of the engine module, in particular the specified part of the module that must be positioned relative to the element of the second structure. In the case of the APU, this makes it possible to adjust the centring of the nozzle of the engine in the mouth of the exhaust duct, so as to maintain a gap between the two.

Advantageously, in a variant of the method, the lengths of all the first connecting rods are adapted relative to the previously defined lengths thereof. This is because any positioning faults may in particular be due to a variation in alignment of the second structure relative to the first, whereas the module must be positioned relative to said second structure. The manufacturing tolerances may make it possible to produce the second connecting rods in advance having lengths corresponding to a correct placement of the engine module relative to the second structure. The invention therefore makes it possible to naturally adapt the length of the first connecting rods in order to correct the variation in placement between the two structures without touching the second connecting rods. In the case of the APU, this makes it possible in particular to correctly position both the nozzle outlet relative to the exhaust, and the air inlet mouth relative to the air admission means.

Advantageously, in such a method, adjusting the lengths of said connecting rods comprises a step in which a model of the engine module, reproducing, with the same geometry, attachment points for the suspension connecting rods device and a zone representing the specified part intended to be positioned relative to the second structure, is fixed to the support, the means for fixing the model using the first and second connecting rods, the previously defined length of which is maintained, and, where applicable, other connecting rods forming part of said model, in order to control the six degrees of freedom of the model relative to the second structure.

The model complies with the dimensions of the module at the attachment points and zones, such as the outlet nozzle in the case of an auxiliary power unit, of which the position is to be adjusted. The use of the model has several advantages. Being lighter and easy to handle, it is possible to place it precisely. When the model is in place, it suffices to adjust the length of the adjustable connecting rods so that they are adjusted in the attachment points in order to obtain a set of connecting rods that will hold the module in the correct position. Moreover, a single model can be used for representing the same APU installed on different aircraft. In addition, it makes it possible to adjust the connecting rods outside the APU assembly line in the aircraft. This is because said model can be machined very precisely for the nominal dimensions, the engine modules mounted on the aircraft being manufactured having certain tolerances. Finally, the model may also be equipped so as to determine the length of any supernumerary connecting rods that may be provided, in the case of redundancy, against risks of rupture.

Advantageously, also, the means for fixing the model to the support comprise at least one connection between the zone representing said specified part of the engine module to be positioned and the element corresponding to the second structure.

In particular, the connection or connections between the zone to be positioned on the model and the corresponding element on the support make it possible to ensure that this zone is naturally in place when the model is installed in the support by adjusting the other connections to the support. It should be noted that, when said connection between the zone representing the specified part of the engine module to be positioned and the element corresponding to the second structure is slidable, it controls two degrees of freedom, which corresponds to the minimum two adjustable connecting rods. It should also be noted that, when the method uses four first adjustable connecting rods on the first structure, the model may be solely connected to the second structure for the step of determining the lengths of the connecting rods, but requires, for this purpose, the addition of two connecting rods forming part of the model, connecting said model to the second structure, in order to control the last two degrees of freedom of the model and to ensure positioning thereof relative to the second structure.

The invention also relates to a support comprising a first structure and a second structure that is offset relative to the first structure, intended for holding an engine module by means of an isostatic suspension connecting said engine module to said first structure by means of first connecting rods and to said second structure by means of second connecting rods, said isostatic suspension being arranged so that at least a specified part of the engine module is positioned relative to an element of the second structure, at least two of said first and second connecting rods comprising a means for adjusting the length thereof.

Such a support achieves the object for the same reasons as the method that said support makes it possible to follow. In particular, all the first connecting rods may comprise a means for adjusting the length thereof.

Advantageously, at least two of said first and second connecting rods are configured so as to be connected to the same attachment point on the engine module in order to minimise the weight and number of interfaces. In particular, the support may comprise four first connecting rods attached to the first structure and two second connecting rods attached to the second structure. These six connecting rods may be distributed in three groups, the connecting rods in each group being configured so as to have the same point of attachment to said engine module. In this case, the first group consists of two of said first connecting rods and one of said second connecting rods, the second group consists of two of said first connecting rods, the third group being formed by one of said second connecting rods. This mounting, referred to as 3-2-1 for an APU, comprises the minimum number of links for holding the APU and minimises the weight of the suspension device.

Advantageously, the means for adjusting the length of at least one connecting rod comprises a tube and a rod cooperating by a means for screwing the rod into the tube. This makes it possible to adjust the connecting rod simply according to the length identified when the module is installed in its place in front of the device, in order to mount it immediately on the attachment points. Optionally, this makes it possible to adjust the connecting rod without dismantling it from the device.

The invention also relates to an assembly comprising a support as described above and an engine module held by said isostatic suspension, said specified part of the engine module being placed so as to match said element of the second structure. The second structure and the engine module may be offset relative to the first structure in the same offset direction, points for attaching said first connecting rods to the module being located close to the end of the module facing the first structure.

Advantageously, in this assembly, at least two of said first and second connecting rods are connected to the same first bracket, so as to be connected to the same attachment point on the engine module, said first bracket comprising one of the parts, male or female, of a conical bolt, the complementary part of which is located on a second bracket fixed to the engine module, the conical bolt having an axis determined by the shape of the second bracket. In this assembly, the axis of the conical bolt is preferably substantially tangential to a path followed by the first bracket when it is moved away from the second bracket.

Each connecting rod mounted on the ball joint allows the free end to move over a sphere centred on the point of attachment on the structure. When two connecting rods that are thus fixed to the structure are attached by their other end, this causes said end to carry out a rotational movement about the axis passing through the attachment points of the ends fixed to the structure. Therefore, if the engine module is in position, the bracket connected to the two connecting rods describes, in space, a circle that joins the position that it must occupy when it is fixed to the complementary bracket which is rigidly connected to the engine module. The orientation of the axis of the cone of the bracket, perpendicular to the plane passing through points of attachment of each of the two connecting rods to the support, and through the common point of attachment thereof to the engine module, corresponds to the direction of this rotation and it then therefore comes to fit naturally in the corresponding cone on the complementary bracket on the engine module. The conical shape, on account of its flare, allows adjustment of the two parts of the fitting when the male part is inserted in the female part. In contrast, for example, simple threaded rods, even oriented correctly, would not be suitable. This is because, due to the rotation, the end of the rod would be offset relative to the opening at the moment of insertion.

As the brackets can thus be assembled on the engine module by rotation about the axis of the points of attachment of the two connecting rods to the structure, it is possible to begin by putting the engine module, or its model, in position by means of a manoeuvre suited to space requirement of said module in the compartment, the connecting rods having been separated to allow its passage, and then to adapt the bracket of the connecting rods on the complementary bracket, fixed to the engine module or to the model, by means of rotation. For example, the use of conical bolts can make the mounting and dismantling operations easier during adjustments of the module or model in the method described above.

The invention also relates to an assembly as described above, in which the engine module comprises an APU having a nozzle outlet, the second structure comprising an exhaust means having a mouth, the discharge end of said nozzle of the module being positioned so that the mouth of the exhaust means surrounds a portion thereof without touching it. In particular, the second structure may be formed by the tail cone of an aircraft and the first structure formed by a bulkhead of the fuselage.

The invention also relates to a model intended to represent an engine module comprising an APU in an assembly according to claim 12, reproducing, with the same geometry as on said engine module, points of attachment of the first and second connecting rods, and a zone representing the nozzle outlet of the APU, said model being provided with a means able to hold the zone representing the nozzle outlet in the mouth of said exhaust means in two degrees of freedom. This arrangement makes it possible to ensure that the gap between the nozzle and the mouth complies with the dimensions for the Venturi effect to be effective.

BRIEF DESCRIPTION OF THE FIGURES

The present invention will be better understood and other details, features and advantages of the present invention will emerge more clearly from reading the following description with reference to the accompanying drawings, in which:

FIG. 6 is a longitudinal section of an end of a connecting rod having an adjustable length.

FIG. 7 is a longitudinal section of the arrangement of a conical bolt.

FIG. 8 is a perspective view of an aspect of the invention in the vicinity of the point of attachment of a plurality of connecting rods to the APU module.

FIG. 9 is a front view of the APU module alone, corresponding to the aspect of the invention shown in FIG. 8.

DETAILED DESCRIPTION OF THE INVENTION

Figure 1:
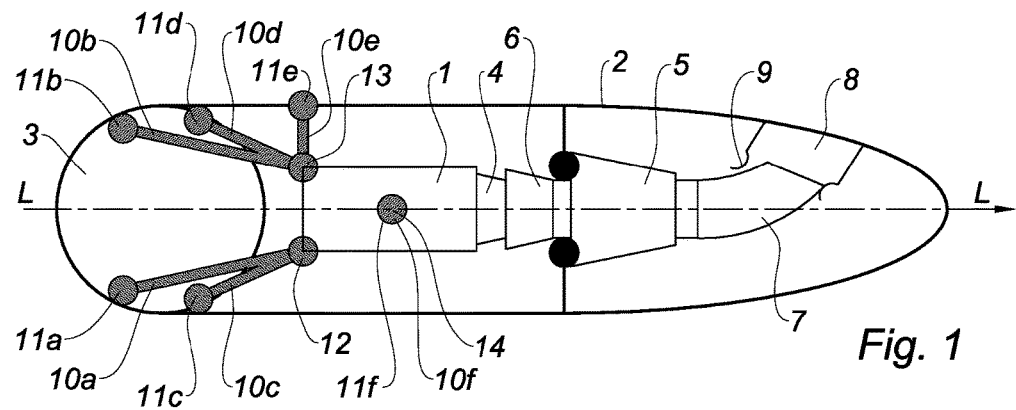
FIG. 1 is a plan view of the theoretical mounting layout of an APU module in its compartment.
Figure 2:
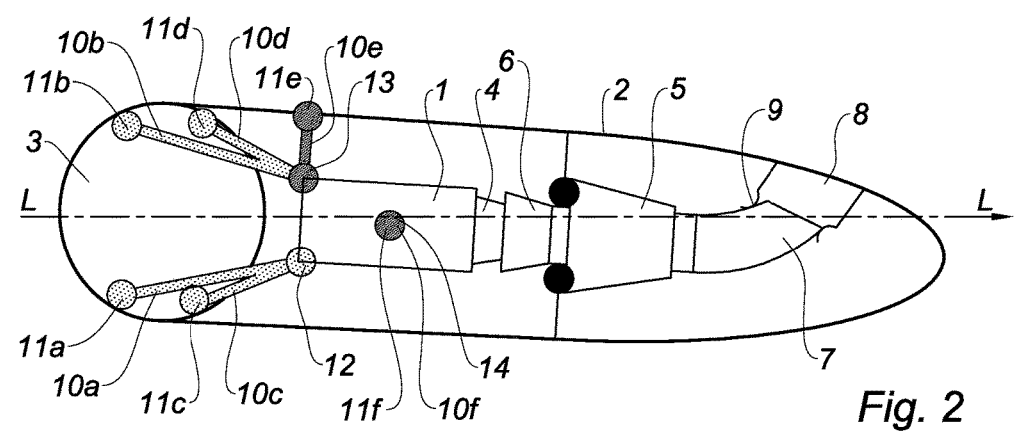
FIG. 2 is a plan view of the mounting layout of an APU module in its compartment according to a first variant of the invention.
Figure 3:
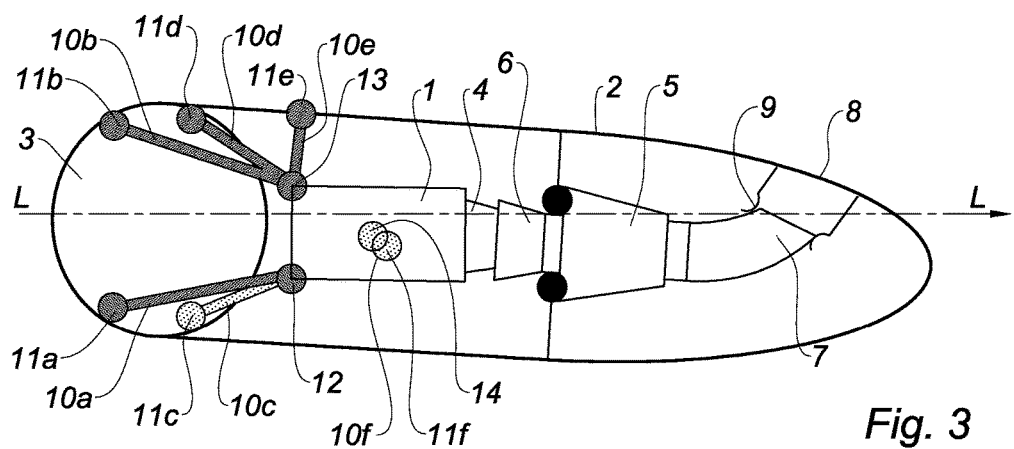
FIG. 3 is a plan view of the mounting layout of an APU module in its compartment according to a second variant of the invention.

With reference to FIGS. 1 to 3, the invention relates, for example, to the installation of an APU engine module 1 in an aircraft compartment having an elongate shape along a given axis LL, delimited laterally and at one end along the axis by a shell 2 and closed at the other end by a bulkhead 3 through which this axis passes. The bulkhead 3 and the shell 2 form a first and second structure respectively, to which equipment can be connected.

In the case an APU module installed in a tail cone of an aircraft, for example, the axis LL corresponds to the axis LL of the fuselage oriented towards the rear, the bulkhead 3 may be a structural bulkhead of the fuselage, and the shell 2 may comprise walls of the fuselage after the bulkhead 2, together with the structure elements that hold them.

As, in general, the axis LL is oriented from front to rear (from the left to the right in FIG. 1), and as this corresponds naturally to the direction of flow, in the remainder of the description reference is made, for convenience, to the front and rear along the directions of the axis LL indicated in FIG. 1. The APU engine module 1 and the shell 2 are both located to the rear of the bulkhead 3. The direction along the axis LL towards the rear is therefore referred to as the offset direction in the remainder of the description.

The APU module 1, shown highly schematically in FIG. 1, forms a module that integrates various items of equipment of the turbine engine and which, in particular, comprises on its rear face a nozzle 4 for discharging gases from the turbine engine.

An exhaust duct 5 collects these exhaust gases through a mouth 6, at the front of the duct, which covers the discharge nozzle 4 of the turbine engine in part. As shown in the figure, this mouth 6 has a flared shape, wider than the nozzle 4. Ideally, the nozzle 4 and the mouth 6 are concentric and the difference in diameter forms an annular space of sufficient thickness to suction the air from the compartment. In practice, the two elements may not be perfectly aligned but they must leave a passage over the entire periphery of the nozzle, the thickness of which must remain between a minimum value and a maximum value.

The duct 5 next discharges the gases into the air, outside the compartment. For this purpose, the rear end 7 of said duct emerges in an orifice 8 of the shell 2. This orifice 8 may be provided with a device 9 for holding the rear end 7 of the duct 5. This device 9 may have a resilience that enables it to maintain contact with the duct in the vicinity of the rear end 7 thereof despite small movements relative to the theoretical position. It may thus also integrate a fire-resistance function by preventing communication between the inside of the compartment of the APU and the outside.

The suspension of the APU generally comprises six links, 10a to 10f, which ensure the positioning of said suspension according to the six degrees of freedom relative to the compartment. Each link connects a point of attachment 11a to 11f on one of the structures of the compartment to a point of attachment 12-13-14 on the APU. These links are generally connecting rods connected by a ball-joint connection at their point of attachment to the structure, which allows them, individually, to permit the point of attachment to the APU module to move over at least a portion of a sphere centred on point of attachment to the structure.

Six correctly placed links make it possible to isostatically lock the six degrees of freedom of the APU module 1 and to thus correctly position said module. A suspension device may comprise additional links for countering risks of failure of a connecting rod. However, these additional links do not modify the invention since they are installed once the six main links are correctly placed, being adjusted relative to the position that their attachment points occupy.

Although this is not obligatory, the six connecting rods holding the engine module may be arranged in accordance with the 3-2-1 configuration, as shown in FIG. 1. In this configuration, four connecting rods 10a-10b-10c-10d are attached to the structural bulkhead 3 by the attachment points 11a-11b-11c-11d, and two connecting rods 10e-10f are attached to the shell 2 by the attachment points 11e-11f. The connecting rods 10a and 10c are attached to the same attachment point 12 on the APU module 1. The connecting rods 10b, 10d and 10e are attached to the same attachment point 13 on the APU module. The connecting rod 10f is connected to a third attachment point 14 on the APU module 1.

The attachment points 12 and 13 are advantageously placed at the front on the APU module 1, facing the bulkhead 3 and towards the lateral ends relative to the offset direction. This configuration provides a significant lever arm for moving the zones of the APU module 1 located to the rear, such as the discharge nozzle 4, when these attachment points are moved, by acting on the lengths of the connecting rods. Moreover, the attachment point 14 is located on the top of the APU module 1 towards the middle. Equally, its separation from the two other attachment points 12-13 and the non-flattened triangle that it forms therewith, make it possible to easily adjust the position of a point on the APU module 1 by moving these three points.

The points of attachment 11b and 11d of the connecting rods 10b and 10d to the bulkhead 3 are located, respectively, above and below the attachment point 13 on the APU module 1. The attachment point 11e of the connecting rod 10e is located laterally relative to the attachment point 13 on the APU module 1. These three connecting rods therefore make it possible to control the three degrees of freedom corresponding to translations.

Likewise, the points of attachment 11a and 11c of the connecting rods 10a and 10c to the bulkhead 3 are located, respectively, above and below the attachment point 12 on the APU module 1 and are also offset laterally outwards. This makes it possible to control two rotations of the APU module 1.

The last connecting rod 10f, fixed to the shell 2 by an attachment point 11f located, in FIG. 1, vertically in line with the attachment point 14 on the APU module 1, makes it possible to control the last rotation, which will define in particular the vertical position of the nozzle outlet.

Other configurations may be used without changing the nature of the invention. There may be more attachment points on the engine module or the groupings may be different. Moreover, the distribution between four connecting rods attached to the bulkhead 3 and two attached to the shell is not fixed. Thus, for example, the connecting rod 10e, or 10f, or both, may be attached to the bulkhead 3. One or more of the connecting rods 10a, 10b, 10c, 10d may be connected to the shell 2.

With reference to FIG. 1, the system thus defined makes it possible to determine a nominal length of the six connecting rods so that, according to the design drawings, the APU module 1 is perfectly aligned along the axis LL of the shell 2, as shown in FIG. 1. The front of the exhaust duct 5 has been fixed so that its mouth 6 is centred relative to the shell 2 and surrounds the outlet of the nozzle while leaving the space necessary for producing the Venturi effect. Moreover, the rear end 7 of the exhaust is correctly centred in the orifice 8 and held without excessive force by the connection means 9.

However, as already mentioned, the accumulation of manufacturing tolerances on the connecting rods, on the APU module 1 or on the shell 2, in particular in its links with the rest of the structure of the aircraft, to which the structural bulkhead 3 is rigidly connected, may cause alignment errors.

With reference to FIG. 2, according to a first embodiment of the invention, the exhaust duct 5 is held so as to be centred relative to the shell 2, and it is possible to vary the length of the four connecting rods 10*a*-10*b*-10*c*-10*d* attached to the structural bulkhead 3, as shown in FIG. 2. In contrast, for the two connecting rods 10*e*-10*f*, the nominal length previously defined on the model is preserved. In the example in FIG. 2, the alignment error is essentially due to the variations in manufacture of the shell 2 or of its connection to the structural bulkhead 3, which means that this shell is misaligned relative to the direction LL perpendicular to the bulkhead. However, the invention may apply to other cases, for example if the manufacturing variations in the APU module and/or the connecting rods mean, on the contrary, that it is the module that is misaligned relative to the direction LL. It may also be the case that the two causes occur simultaneously. In all cases, it is necessary to realign the engine module 1 relative to the shell 2 so that the outlet of the nozzle 4 is placed correctly in the mouth 6 of the exhaust duct 5.

In a way, this first embodiment shown is optimum for positioning the APU module 1 relative to elements fixed to the shell 2. This is because, if the connecting rods have been calculated for perfect alignment of the APU module 1 relative to the shell 2, the connecting rods 10*e*-10*f* attached to the shell have the correct length and do not need to be modified. As is shown in FIG. 2, modifying the length of the four connecting rods 10*a*-10*b*-10*c*-10*d* attached to the structural bulkhead 3 makes it possible to nominally replace the APU module 1 relative to the shell 2 and to align the nozzle 4 with the mouth 6 of the exhaust duct 5.

If the lengths of fewer connecting rods than those that are attached the bulkhead 3 are varied, it may be advantageous to include connecting rods attached to the shell 2 in those connecting rods of which the length is varied. In a second embodiment, with reference to FIG. 3, only two connecting rods 10*f*-10*c* are adjusted for length, specifically the connecting rod 10*f* that supports the APU module 1 vertically towards its middle at the attachment point 14 and the connecting rod 10*c* that supports the front attachment point 12 towards the front and downwards.

This suspension makes it possible, even if the APU module 1 is not perfectly aligned with the shell 2, to position the outlet of the nozzle 4 sufficiently correctly to preserve the gap by means of the mouth 6 of the exhaust that allows the Venturi effect. Since the exhaust duct 5 is in its nominal position in the shell 2, its rear end 7 moreover remains correctly positioned relative to the orifice 8 and there are therefore no undesirable forces exerted on the connection means 9.

It is also possible to vary the length of any two connecting rods from among the six that the suspension of the APU module 1 comprises. Since the model described below requires two degrees of freedom to be locked in order to establish the necessary clearance between the nozzle 4 and the mouth 6, the two adjustable connecting rods next adapt to the model and to the APU 1 in order to ensure a suitable position for preserving the required clearance. Adjusting two connecting rods does not, however, make it possible to nominally entirely reposition the APU module 1 relative to the shell 2, unlike the adjustment of the four connecting rods to the structural bulkhead 3, which may result in an accentuated misalignment of other interfaces between the APU 1 and the shell 2, for example of air inlets for admitting air to the turbine engine.

Moreover, the fact that the attachment point 12 of at least one of the connecting rods 10*c*, the distance of which is varied, is located on the APU module 1 at an opposite end to the outlet of the nozzle 4 that is to be positioned in the offset direction LL, is advantageous. This is because the variations in the positions of the front attachment points 12-13 on the module are amplified at the outlet of the nozzle 4.

According to one aspect of the invention, when designing the compartment and the engine module, the six connecting rods 10*a*-10*b*-10*c*-10*d*-10*e*-10*f* of the isostatic suspension device of the APU module 1 are manufactured having the previously defined length. In contrast, the connecting rods of which it has been decided to adjust the length, for example 10*a*-10*b*-10*c*-10*d*-10*e*-10*f* according to one of the two examples above, are provided with means for adjusting their length, at least within certain limits, relative to the nominal length for which they were manufactured.

In the embodiment illustrated in FIG. 6, at least at one end of the connecting rod 10, the head 15 intended to surround the ball joint 16 that is rigidly connected to the fixing bracket is extended by a rod 17, the end of which is threaded. The body of the connecting rod 10 comprises, at the corresponding end, a hollow thread configured so as to cooperate with the threaded rod 17 of the head 15. By this means, the length of the connecting rod 10 can be adjusted by screwing or unscrewing the threaded rod 17 of the clevis in the body of the connecting rod 10. When the length is adjusted, the movement of the rod 17 can be reversibly locked relative to the body of the connecting rod 10, by means of a locknut for example. It is also possible to adhesively bond the two parts but it is then necessary to destroy the adhesive bonding if the length is to be modified once again. Locking is, however, not necessary: when the head 15 is inserted in its clevis (not shown in FIG. 6) and locked by means of a bolt passing through said head and clevis, the head 15 can then no longer screw in or unscrew.

A first example of the method according to the invention for mounting the APU engine module 1 in its compartment formed by the structural bulkhead 3 and the shell 2 corresponds to the first case set out with reference to FIG. 2, where the length of four connecting rods 10*a*-10*b*-10*c*-10*d* attached to the bulkhead 3 is varied. The steps indicated below are carried out.

In a preliminary step, a device for suspension by means of connecting rods is designed, according to the manufacturing drawings, to hold the APU module 1 in position relative to the structural bulkhead 3 and the shell 2. This positioning is achieved in particular taking account of the correctly centred position of the mouth 6 of the exhaust duct 5 relative to the shell 2. This positioning may also take into account the adjustment of other parts of the APU engine module 1 relative to other equipment attached to the shell 2, for example air inlets for admitting air to the turbine engine. This design determines the position of the points of attachment of the connecting rods to the structures of the aircraft and to the engine module, as well as the length of the connecting rods. This design step results in defining an engine module suspension device according to one of the variants described above with regard to the suspension device, comprising connecting rods of variable length.

Figure 4:
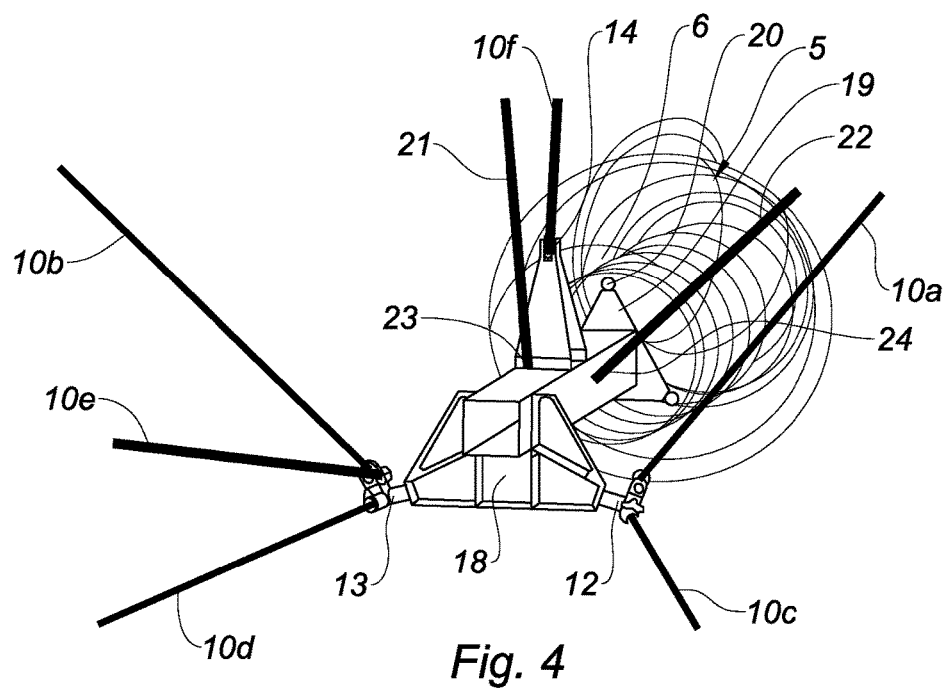
FIG. 4 is a perspective view of the mounting layout of a model of an APU module according to the variant of the invention corresponding to FIG. 2.

A first intermediate step comprises the manufacture of a model 18, shown in FIG. 4. This model 18 is manufactured in the form of a light structure, which is substantially in the form of a beam oriented in the main direction of the model 18. The model is configured so as to faithfully represent, together with their relative positions, firstly the points of attachment 12-13-14 of the APU engine module 1 to their brackets for connecting to the suspension device in the compartment, and secondly a zone representing the outlet of the nozzle 4, consisting of a centring means 19 intended to come into contact with the inside of the mouth 6 of the exhaust duct 5, or in the exhaust duct 5 itself.

This means 19 for centring in the mouth 6 of the exhaust is in the shape of a substantial equilateral triangle perpendicular to the main direction of the model 18, which substantially corresponds to the direction of the axis of the nozzle 4. Each of the vertices of this triangle is provided with a shoe 20 affording a single point of contact in the duct, and optionally spring-mounted. This means is configured so as to represent the nozzle 4 plus the thickness of the gap to be complied with between said nozzle and the mouth 6 of the exhaust duct 5. Said means is optionally modified so as to allow hot rather than cold centring of the nozzle 4 in the mouth 6. Said means is also configured so as to be able to slide against the internal walls of the mouth 6 of the exhaust duct 5, while allowing rotations of the model 18.

Preferably, this model 18 is produced having the nominal dimensions, at a precision significantly superior to the manufacturing tolerances of the APU engine modules 1. A study has shown that, taking account of the manufacturing tolerances on APU modules, this makes it possible to manufacture only one model 18 to represent all the APU modules coming off a manufacturing line.

The step of determining the lengths of the connecting rods 10a-10b-10c-10d so that the APU module is correctly positioned in the compartment, comprising the assembled bulkhead 3, shell 2 and exhaust duct 5, uses the model 18 manufactured in the previous step, in the manner shown in FIG. 4. This figure shows, in correspondence with FIG. 2, the four connecting rods 10a-10b-10c-10d in their position when they are connected to the attachment points on the bulkhead 3, and the two connecting rods in their position when they are connected to the attachment points 10e-10f on the shell 2 of the compartment. The figure does not show the bulkhead 3 or the structural parts of the shell 2 supporting the attachment points. However, the exhaust duct 5 is shown, together with its mouth 6.

During this step, with reference to FIG. 4, the model 18 is installed in the compartment in place of the APU engine module. The centring means 19 is inserted in the mouth 6 of the exhaust, or in the exhaust duct itself, so that the shoes 20 are in contact with the inside wall of the mouth or of the duct. The two connecting rods 10e-10f attached to the shell 2 (not shown) are fixed, with their nominal length, to the attachment points 14 and 13 of the model corresponding to those of the engine module. To complete the suspension of the model 18 and to end the centring relative to the shell 2, two additional connecting rods 21-22, temporarily attached to the shell 2, are fixed at points 23-24 on the model, so as to fix the last two degrees of freedom. The model 18 is thus perfectly positioned relative to the shell 2 and to the exhaust 6.

Once the model 18 has been put in place and held by this fixing device, the length of the four connecting rods 10a-10b-10c-10d is adjusted so that said rods can be fixed at their attachment points on the bulkhead 3 (not shown in FIG. 4) and at their attachment points 12-13 on the model 18.

At the end of this intermediate step, the suspension device, together with its connecting rods 10a-10b-10c-10d-10e-10f, is in place on the model 18, having the desired lengths for the connecting rods of which the length is to be varied.

It should be noted that, in this variant, the model 18 represents the position of the APU engine module 1 as it should be exactly centred in the shell 2. For example, the air inlet openings connected to the shell will therefore also be opposite the air inlet openings on the module without it being necessary to adapt interfaces.

The following step therefore consists in detaching the model 18 from the suspension device of the module, by removing the additional connecting rods 21-22 that connected it to the shell 2.

The last step is therefore the mounting of the APU module 1 on the suspension device, carried out by virtue of the previous steps.

A second example of the method according to the invention for mounting the APU engine module 1 in its compartment formed by the structural bulkhead 3 and the shell 2 corresponds to the second case set out with reference to FIG. 3, where the length of any two connecting rods, for example 10c attached to the bulkhead 3 and 10f attached to the shell 2, is varied. The same succession of steps is carried out as in the first example.

The preliminary step of designing the various elements and the suspension device is the same. It results in the same previously defined lengths of the six connecting rods of the suspension device.

The first intermediate step results in the production of the same model 18.

The step of determining the lengths of connecting rods differs in particular in the method of fixing the model 18. During this step, with reference to FIG. 5, the model 18 is installed in the compartment in place of the APU engine module. The centring means 19 is inserted in the mouth 6 of the exhaust so that the shoes 20 are in contact with the inside wall of the mouth or of the duct. Then the four connecting rods 10a-10b-10d-10e, of which the length, previously defined during the preliminary step, is preserved, are installed on the model 18. This involves the connecting rod 10a fixed to its attachment point 11a on the bulkhead 3 (not shown in FIG. 5) and to the attachment point 12 of the model corresponding to that of the APU module, the two connecting rods 10b-10d connecting the corresponding attachment points 11b-11d on the bulkhead 3 to the attachment point 13 on the model 18, and the connecting rod 10e fixed to its attachment point 11e on the shell 2 (not shown in FIG. 5) and also to the attachment point 13 of the model 18.

Once these connecting rods have been fixed, unlike the previous variant, there is no longer any additional connecting rod to install. This is because, by adding the two degrees of freedom controlled by the centring means 19 inserted in the mouth 6 of the exhaust, all the degrees of freedom of the model 18 are locked.

Figure 5:
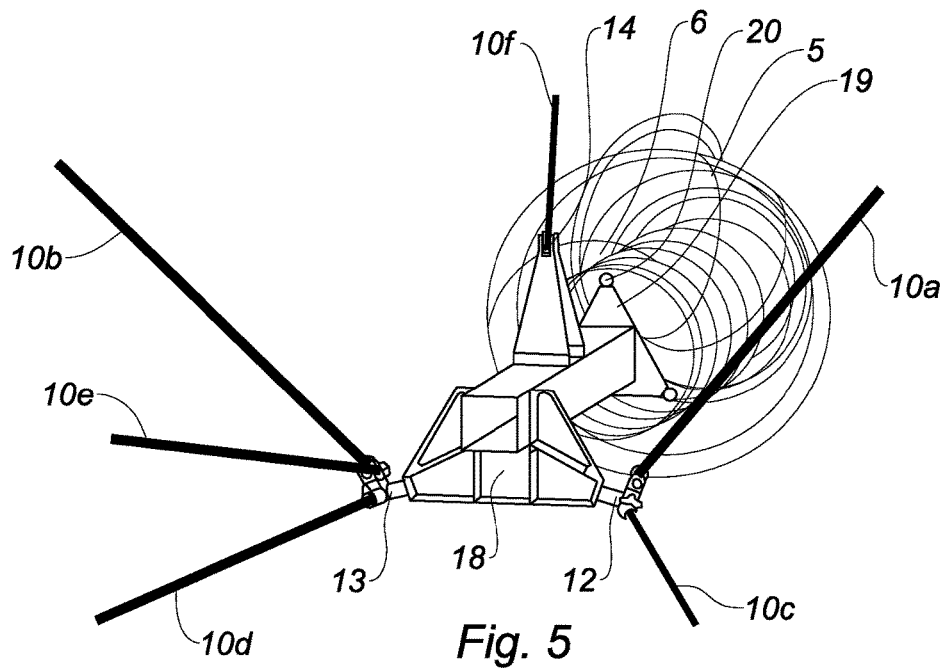
FIG. 5 is a perspective view of the mounting layout of a model of an APU module according to the variant of the invention corresponding to FIG. 3.

This step therefore ends in adjusting the length of the remaining two connecting rods 10c-10f of the device so that one 10c can be fixed to its attachment point 11c on the bulkhead 3, not shown in FIG. 5, and to its attachment point 12 on the model 18, and so that the other connecting rod 10f can be fixed to its attachment point 11f on the shell 2 (not shown in FIG. 5) and to its attachment point 14 on the model 18.

The following steps of the method then take place in the same way as for the first example.

The progression of the method has been set out for particular choices of connecting rods of which the length is to be varied, but it can easily be adapted to other choices. Moreover, the use of a model is not obligatory since the lengths of the adjustable connecting rods can be determined by any means, once the dimensions of the engine module and the structures actually produced and installed have been taken into account.

In a particular embodiment of the invention, a plurality of connecting rods can converge towards the same attachment point on the engine module. This is in particular the case in the example that was used to show the various variant alignments of the APU by adjusting the length of the connecting rods where said rods form a mounting 3-2-1, mentioned above.

In general, the isolated connecting rod supports the APU vertically from above, while the attachment points of the first and second groups of connecting rods are located laterally towards the front of the APU. This arrangement corresponds to a mounting/dismantling of the APU in a favoured vertical direction downwards. To facilitate the mounting/dismantling of the APU, one aspect of the invention consists in separating each fixing lug on the APU, in particular those of the first and second groups of links, into two complementary lugs.

FIG. 8 shows this configuration for the first group of three connecting rods 10*b*-10*d*-10*e*, at the attachment point 13 on the APU 1. The three connecting rods 10*b*-10*d*-10*e* may be attached to the same first bracket 25 supporting the connections to the connecting rods and cooperating with a second bracket 26 fixed to the APU engine module 1 or to the model 18.

In the same way, at the attachment point 12 (not shown in FIG. 8), the two connecting rods 10*a*-10*c* of the second group may be attached to the same first bracket 25 supporting the connections to the connecting rods and cooperating with a second bracket 26 fixed to the APU engine module 1 or to the model 18.

With reference to FIG. 7, these two complementary brackets 25-26 have a conical male/female interface, the male part 27 terminating in a thread 28 that makes it possible to lock it with a nut 29 when it is positioned in the female part 30. When said parts are fitted together, the cones of the male 27 and female 30 parts have an identical axis of symmetry CC.

Generally, the bracket 25 connected to the connecting rods comprises the female part 30, while the male cone 27 is carried by the bracket 26 fixed to the APU module 1 or to the model 18.

In a first solution (not shown), the axes CC of the cones are vertical. The male cone 27 on the group then is inserted naturally in the female part 30 of the corresponding bracket of the suspension device when the APU module 1 or the model 18 is translated vertically in order to mount or dismantle it.

This system, referred to as a "conical bolt", makes it possible to easily mount or dismantle the APU by screwing just a single nut 29 locking the interface cone of each group of links. The conical interface makes it possible to transfer the forces while facilitating mounting.

In a variant, with reference to FIG. 8, two connecting rods 10*b*-10*d* are rigidly held on the bracket 25 carrying the female part 30. If a third connecting rod 10*e* also arrives on this bracket 25, it is detached. In this case, the bracket 25 connected to the two connecting rods 10*b*-10*d*, when it is disconnected from the bracket 26 connected to the APU module 1, can describe an arc of a circle about the axis passing through the points of attachment 11*b*-11*d*, on the bulkhead 3, of the two connecting rods 10*c*-10*d* to which the bracket 25 is connected. In this embodiment, the axis CC of the male cone 27 of the bracket 26 fixed to the APU module 1, or to the model 18, is oriented thereon so as to be tangent to the arc of a circle described by the bracket 25 connected to the connecting rods 10*b*-10*d* in the vicinity of the attachment point 13, when the APU engine module 1 is installed on the suspension device. Moreover, the bracket 25 connected to the connecting rods 10*b*-10*d* is itself configured so that the axis CC of its female cone 30 is tangent to the rotational movement imposed by the two connecting rods 10*b*-10*d* to which it is intended that said bracket remains connected during the mounting/dismantling operations.

The invention can also be used for an axis CC close to but not coinciding with the tangent of the rotational movement.

In a 3-2-1 suspension arrangement of the APU engine module 1, the two front attachment points 12-13 of the engine module may be configured in this way, as shown in FIG. 9. It can be seen in particular, in this figure, that the lateral release directions of the connecting rods, indicted by the direction of the axes CC of the male cones 27 on the brackets 26 at the points 12 and 13, do not encounter any obstacle connected to the engine module, while the vertical direction above the attachment point 13 is obstructed by an element of the APU module 1.

The use of a 3-2-1 mounting of the APU module 1 is, however, not obligatory. Likewise, it is always possible to produce the connection of the connecting rods more conventionally, even when a plurality of connecting rods converge towards the same attachment point.

The various aspects and improvements of the invention have been described in detail for the case of an APU installed in a compartment. However, the applicant does not intend to limit itself to this specific case. A person skilled in the art can easily adapt the invention for any engine suspended with a certain offset on a structure, for which it is necessary to adapt the suspension so as to take up any errors in centring or alignment in this offset direction.

The invention claimed is:

1. Method for mounting an engine module in a support comprising a first structure and a second structure that is offset relative to the first structure, the method comprises:
   positioning the engine module relative to the second structure by means of an isostatic suspension connecting the engine module to said first structure with first connecting rods, and to said second structure with second connecting rods, the length of said first and second connecting rods being defined in advance, and
   adjusting the length of at least two of said first and second connecting rods relative to the previously defined length thereof, in order to position a specified part of the engine module relative to an element of the second structure in said support.

2. Method according to claim 1, wherein the length of all the first connecting rods is adapted relative to a variation in alignment of the second structure relative to the first structure, the length of all the first connecting rods being adapted relative to their previously defined length.

3. Method according to claim 1, wherein the adjustment of the lengths of said connecting rods comprises a step in which a model of the engine module, reproducing, with the same geometry, attachment points for the suspension connecting rod device and a zone representing the specified part of the engine module configured to be positioned relative to the second structure, is fixed to the support, the means for fixing the model using the first and second connecting rods, the previously defined length of which is maintained, and a step of detaching the model from the support.

4. Method according to claim 3, wherein the means for fixing the model to the support comprise at least one connection between the zone representing said specified part of the engine module to be positioned and the corresponding element of the second structure.

5. Support comprising a first structure, a second structure that is offset relative to the first structure, configured to hold an engine module by means of an isostatic suspension connecting said engine module to said first structure with first connecting rods and to said second structure with second connecting rods, said isostatic suspension being arranged so that at least a specified part of the engine module is positioned relative to an element of the second structure, at least two of said first and second connecting rods comprising a means for adjusting the length thereof.

6. Support according to claim 5, wherein all the first connecting rods comprise a means for adjusting the length thereof.

7. Support according to claim 5, wherein at least two of said first and second connecting rods are configured so as to be connected to the same attachment point on the engine module.

8. Support according to claim 5, wherein the means for adjusting the length of at least one of said first and second connecting rods comprises a tube and a rod cooperating by a means for screwing the rod into the tube.

9. Assembly comprising a support according to claim 5, and an engine module held by said isostatic suspension, said specified part of the engine module being placed so as to match said element of the second structure.

10. Assembly according to claim 9, wherein the second structure is offset relative to the first structure and the engine module is offset relative to the first structure in the same offset direction as the second structure, points of attachment of said first connecting rods to the module being located in the vicinity of the end of the module facing the first structure.

11. Assembly according to claim 9, wherein at least two of said first and second connecting rods are configured so as to be connected to the same attachment point on the engine module, and said two connecting rods configured so as to be attached to the same attachment point on the engine module are connected to the same first bracket comprising one of the parts, male or female, of a conical bolt, the complementary part of which is located on a second bracket fixed to the engine module, the conical bolt having an axis determined by the shape of the second bracket, assembly wherein the axis of the conical bolt is substantially tangential to a path followed by the first bracket when said bracket is moved away from the second bracket.

12. Assembly according to claim 9, wherein the engine module comprises an APU having a nozzle outlet, the second structure comprising an exhaust means having a mouth, the outlet end of said nozzle of the engine module being positioned so that the mouth of the exhaust means surrounds a portion thereof without touching it.

13. Support comprising a first structure, a second structure that is offset relative to the first structure, configured to hold a model of an engine module by means of an isostatic suspension connecting said model to said first structure with first connecting rods and to said second structure with second connecting rods, said isostatic suspension being arranged so that a zone of the model is positioned relative to an element of the second structure, at least two of said first and second connecting rods comprising a means for adjusting the length thereof.

14. Assembly comprising a support according to claim 13, and a model of an engine module held by said isostatic suspension, the zone of the model being placed so as to match said element of the second structure.

15. Assembly according to claim 14, wherein the model comprises a zone representing a nozzle outlet of an APU, the second structure comprising an exhaust means having a mouth, the outlet end of said zone representing a nozzle outlet of an APU being positioned so that the mouth of the exhaust means surrounds a portion thereof without touching it.

16. Model in an assembly according to claim 15, said model being provided with a means able to hold the zone, representing the nozzle outlet, in the mouth of said exhaust means according to two degrees of freedom.

* * * * *